United States Patent
Nesta et al.

(10) Patent No.: US 11,687,770 B2
(45) Date of Patent: Jun. 27, 2023

(54) RECURRENT MULTIMODAL ATTENTION SYSTEM BASED ON EXPERT GATED NETWORKS

(71) Applicants: SYNAPTICS INCORPORATED, San Jose, CA (US); THE TRUSTEES OF INDIANA UNIVERSITY, Bloomington, IN (US)

(72) Inventors: Francesco Nesta, Aliso Viejo, CA (US); Lijiang Guo, Bloomington, IN (US); Minje Kim, Bloomington, IN (US)

(73) Assignees: SYNAPTICS INCORPORATED, San Jose, CA (US); THE TRUSTEES OF INDIANA UNIVERSITY, Bloomington, IN (US)

( * ) Notice: Subject to any disclaimer, the term of this patent is extended or adjusted under 35 U.S.C. 154(b) by 1000 days.

(21) Appl. No.: 16/417,554

(22) Filed: May 20, 2019

(65) Prior Publication Data

US 2019/0354797 A1 Nov. 21, 2019

Related U.S. Application Data

(60) Provisional application No. 62/673,801, filed on May 18, 2018.

(51) Int. Cl.
*G06N 3/08* (2023.01)
*G06V 10/40* (2022.01)
(Continued)

(52) U.S. Cl.
CPC .......... *G06N 3/08* (2013.01); *G06F 18/2113* (2023.01); *G06F 18/254* (2023.01); *G06N 3/045* (2023.01);
(Continued)

(58) Field of Classification Search
CPC .... G06K 9/623; G06K 9/6292; G06N 3/0454; G06N 3/08; G06N 3/044; G06N 3/045;
(Continued)

(56) References Cited

U.S. PATENT DOCUMENTS 6,219,640 B1 4/2001 Basu et al.
9,318,129 B2 4/2016 Vasilieff et al.
(Continued)

OTHER PUBLICATIONS

Sharma et al., "LIVELINET: A Multimodal Deep Recurrent Neural Network to Predict Liveliness in Educational Videos" EDM 2016: 215-222 (Year: 2016).*

(Continued)

*Primary Examiner* — Kenny A Cese
(74) *Attorney, Agent, or Firm* — Paradice & Li LLP

(57) ABSTRACT

Systems and methods for multimodal classification include a plurality of expert modules, each expert module configured to receive data corresponding to one of a plurality of input modalities and extract associated features, a plurality of class prediction modules, each class prediction module configured to receive extracted features from a corresponding one of the expert modules and predict an associated class, a gate expert configured to receive the extracted features from the plurality of expert modules and output a set of weights for the input modalities, and a fusion module configured to generate a weighted prediction based on the class predictions and the set of weights. Various embodiments include one or more of an image expert, a video expert, an audio expert, class prediction modules, a gate expert, and a co-learning framework.

19 Claims, 4 Drawing Sheets

(51) Int. Cl.
  *G06V 10/764* (2022.01)
  *G06V 10/80* (2022.01)
  *G06V 10/82* (2022.01)
  *G06F 18/2113* (2023.01)
  *G06F 18/25* (2023.01)
  *G06N 3/045* (2023.01)

(52) U.S. Cl.
  CPC ............ *G06V 10/40* (2022.01); *G06V 10/764* (2022.01); *G06V 10/811* (2022.01); *G06V 10/82* (2022.01)

(58) Field of Classification Search
  CPC ............... G06F 18/2113; G06F 18/254; G06F 18/2413; G06F 18/256; G06V 10/40; G06V 10/764; G06V 10/811; G06V 10/82
  See application file for complete search history.

(56) References Cited

U.S. PATENT DOCUMENTS

| | | |
|---|---|---|
| 2007/0100630 A1 | 5/2007 | Manabe et al. |
| 2013/0190043 A1 | 7/2013 | Kulas |
| 2017/0061966 A1 | 3/2017 | Marcheret et al. |

OTHER PUBLICATIONS

Wu et al., "Multi-Stream Multi-Class Fusion of Deep Networks for Video Classification", 2016 ACM (Year: 2016).*

Calvert, Gemma A., et al., "The HandBook of Multisensory Processes", 2004, pp. 1-25, Massachusetts Institute of Technology.

Nath, Audrey R., et al. "*A neural basis for interindividual differences in the McGurk effect, a multisensory speech illusion*", Neuroimage, Jan. 2, 2012, pp. 1-13.

Dov, David, et al., "Audio-Visual Voice Activity Detection Using Diffusion Maps", IEEE Transactions on Audio, Speech, and Language Processing, vol. 23 No. 4, 2015, pp. 732-745.

Dov, David, et al., "Kernel-based sensor fusion with application to audio-visual voice activity detection." IEEE Transactions on Signal Processing vol. 64. No. 24, 2016, pp. 1-10.

Satoshi, Tamura et al., "A robust audio-visual speech recognition using audio-visual voice activity detection." *Eleventh Annual Conference of the International Speech Communication Association*, 2010, pp. 2694-2697.

Ariay, Ido et al., "A deep architecture for audio-visual voice activity detection in the presence of transients." *Signal Processing* vol. 142, 2018, pp. 69-74.

Szegedy, Christian, et al., "Rethinking the inception architecture for computer vision", *Proceedings of the IEEE Conference on Computer Vision and Pattern Recognition*, 2016, pp. 2818-2826.

Simonyan, Karen, et al., "Very deep convolutional networks for large-scale image recognition", 2014, pp. 1-14.

Mosseri, Inbar, et al., "Looking to Listen: Audio-Visual Speech Separation", Google AI Blog, Apr. 11, 2018, 6 pages. https://research.googleblog.com/2018/04/looking-to-listen-audio-visual-speech.html.

* cited by examiner

RECURRENT MULTIMODAL ATTENTION SYSTEM BASED ON EXPERT GATED NETWORKS

CROSS-REFERENCE TO RELATED APPLICATIONS

This application claims the benefit of U.S. Provisional Patent Application No. 62/673,801 filed May 18, 2018 and entitled "RECURRENT MULTIMODAL ATTENTION SYSTEM BASED ON EXPERT GATED NETWORKS" which is hereby incorporated by reference in its entirety.

TECHNICAL FIELD

Various embodiments of the present disclosure relate generally to human-computer interactions and more particularly, for example, to systems and methods for detecting human interactions using a plurality of modalities.

BACKGROUND

Audio signal processing is fundamental to enabling robustness in voice communication and human-computer interaction, such as the voice-based interaction enabled by smart speakers with voice assistants, hands-free communication devices, voice-activated devices, and other voice-based technologies and devices. In these applications, audio signal processing is used to address various problems including: (1) sound enhancement with a goal of enhancing a particular sound source of interest (e.g. a human person who is talking), while suppressing other unwanted noise events, and (2) audio classification with a goal of detecting and discriminating different audio events and assigning the events to specific classes.

In standard voice applications, audio information derived from input audio signals is used to drive the processes for controlling enhancement and classification. However, natural human interaction also involves other modalities, which help in disambiguating decisions which would be difficult to be made only by listening solely to the audio modality. For instance, humans in a natural conversation use auditory and visual cues when listening to a person who is talking. In difficult noisy scenarios, visual cues in the form of facial and lip movements, for example, can make it easier to understand when a person is producing speech. Similarly, focusing on lip movements help humans to associate audio content to specific phonetic content and improve the intelligibility of a conversation. In view of the foregoing, there is a continued need for improved systems and methods for human-computer interactions that utilize multiple modalities and the auditory and visual cues used by humans in natural conversation.

SUMMARY

Systems and methods are disclosed herein for a multimodal classifier using a recurrent attention-based fusion of different modalities. In various embodiments, a system architecture processes a plurality of modalities, such that each modality can contribute to the joint classification task with a different degree of confidence depending on the specific sensorial conditions. The system architecture can dynamically combine information from different types of sensors in a sequential decision-making task. Each sensor is bonded with a modular neural network to maximize the utility of its own information. A gating modular neural network dynamically generates a set of weights for the outputs from the sensor networks by balancing the utility of each sensor's information.

In one embodiment, a system includes individual neural networks trained separately for each input modality, and the weights of a gate network are trained subsequently to fuse the modality predictions. As an example, this system may be applied to the problem of joint audio/video speech activity detection. In another embodiment a co-learning framework is defined to encourage co-adaptation of a subset of latent variables belonging to an expert network related to different modalities.

In various embodiments, a system comprises a plurality of expert modules, with each expert module configured to receive data corresponding to one of a plurality of input modalities and extract associated features, and a plurality of class prediction modules, with each class prediction module configured to receive the extracted features from a corresponding one of the expert modules and predict an associated classification. A gate expert is configured to receive the extracted features from the plurality of expert modules and output a set of weights for each of the input modalities. A fusion module is configured to generate a weighted prediction based on the class predictions and the set of weights.

The system may use a variety of input modalities including images, video and/or audio, and the expert modules may comprise a corresponding image expert, a corresponding video expert and/or a corresponding audio expert. Each expert module may be implemented as a trained neural network. The class prediction modules may include a neural network such as long short-term memory network. In some embodiments, the system further comprises a co-learning framework.

In various embodiments, a method comprises receiving a plurality of data streams, each data stream having a corresponding input modality, and for each data stream, extracting features associated with the corresponding input modality and predicting a classification using the corresponding extracted features. The method further comprises generating a set of weights from the extracted features and fusing the class predictions and the set of weights to produce a weighted prediction.

The method may include a variety of input modalities including images, video, audio and/or other sensed input. The method may further comprise extracting features associated with each corresponding input modality by inputting the data stream to a trained neural network. The method may further comprise predicting the class using the corresponding extracted features by inputting the extracted features to a long short-term memory network. The method may further comprise generating the set of weights from the extracted features by inputting the extracted features to a long short-term memory network.

In various embodiments, a system comprises a memory storing instructions, and a processor coupled to the memory and configured to execute the stored instructions to cause the system to perform various operations. The operations performed by the processor may include receiving a plurality of data streams, each data stream corresponding to separate input modality, and for each data stream, extracting features associated with the corresponding input modality, and predicting a classification using the corresponding extracted features. The operations further include generating a set of weights from the extracted features and fusing the classification predictions and the set of weights to produce a weighted prediction.

The system may be further configured to accept a variety of input modalities including images, video and/or audio, and the operations performed by the processor may further include extracting features associated with each input modality by a process that includes inputting the corresponding data stream to a trained neural network. The operations may further include predicting a classification using the corresponding extracted features by inputting the extracted features to a long short-term memory network. In some embodiments, generating the set of weights from the extracted features comprises inputting the extracted features to a long short-term memory network.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
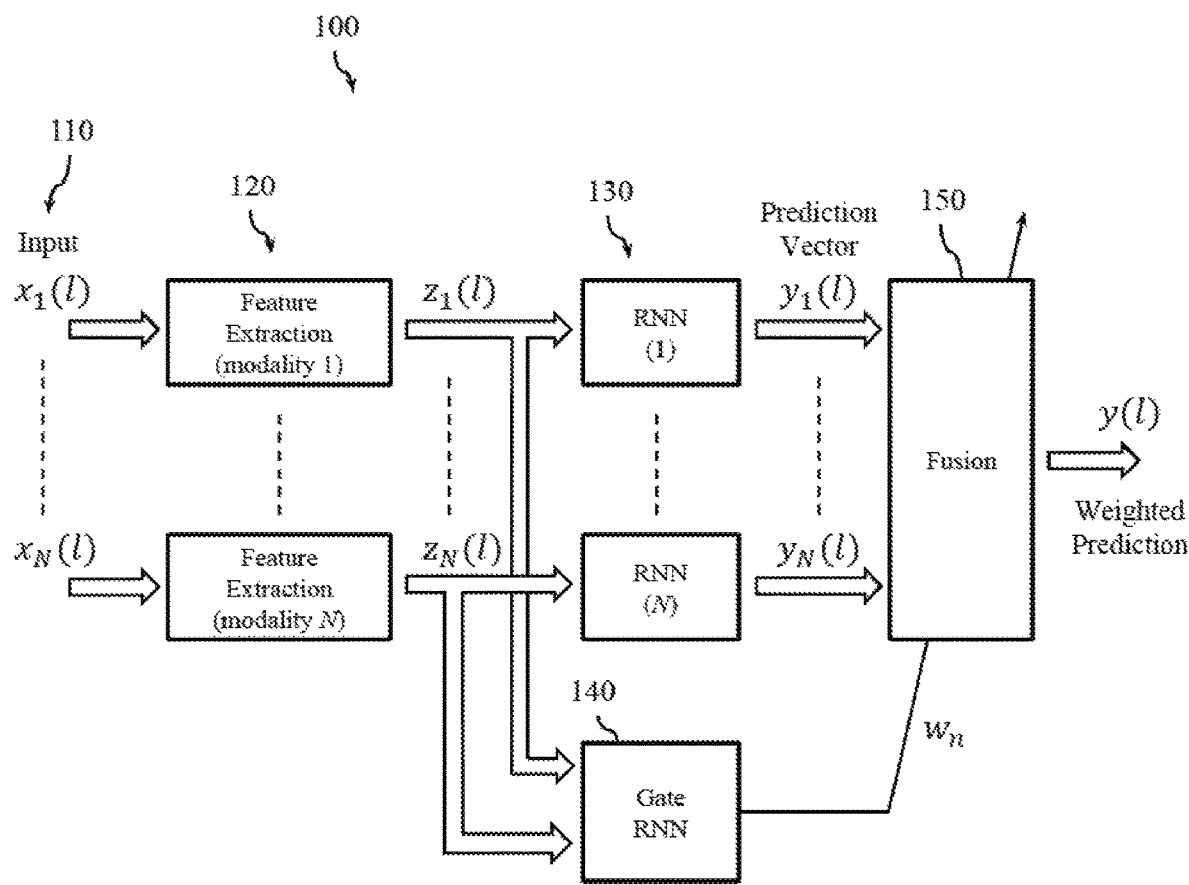
FIG. 1 is an example system structure for a recurrent multimodal attention system based on recurrent gated expert networks, according to one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes embodiments for a multimodal classifier using a recurrent attention-based fusion of different input modalities. In various embodiments, a system architecture processes a plurality of input modalities, such that each modality can contribute to the joint classification task with a different degree of confidence depending on the specific sensorial conditions. The system architecture can dynamically combine information from different types of sensors in a sequential decision-making task. Each sensor may be bonded with a modular neural network to maximize the utility of its own information. In some embodiments, a gating modular neural network dynamically generates a set of weights for the outputs from the sensor networks, by balancing the utility of each sensors' information.

In various embodiments, a general approach for fusing multimodal information is implemented with the common task to produce a classification of incoming input vectors. The system can, for example, be applied to joint Audio/Video voice activity detection (AVVAD) but the structure is general and not restricted to this specific task. Weights of the posterior prediction for each modality may be predicted dynamically by using a gate network, which has a goal of determining which modality is more reliable for a determined condition at the input.

In some embodiments, individual neural networks are specialized to predict a certain class from each modality independently, and then a gate network fuses this information and outputs fusion weights explicitly. The systems and methods of the present disclosure are more robust than conventional approaches and allow the system to "reject" a modality for which there is a high level of uncertainty. Embodiments disclosed herein can further take benefit of unimodal labeled data. In fact, the modular experts can be trained with data and labels for which a single modality is available and only the gate network uses data where all the modalities are available. The modularization may be useful in preventing overfitting because a smaller network can be used when treating each modality separately. The network topology of each expert may be optimized to the characteristic of the specific modality.

In the embodiments illustrated herein, systems and methods include: (i) a general structure for a recurrent multimodal attention system based on recurrent gated expert networks; (ii) an implementation of the general structure for audio/video-based speech activity detection; and (iii) a co-learning framework based on jointly trained audio and video subsystems.

An example embodiment of a general structure for a recurrent multimodal attention system based on recurrent gated expert networks is presented in FIG. 1. As illustrated, a system 100 includes a plurality of input modalities 110. Each input modality 110 has an associated input vector $x_n(l)$ which might be comprised of a stacked column vector of signals captured at different consecutive time instants. The input modalities may include one or more audio signals (e.g., a mono audio signal, stereo audio signal or a multi-channel audio signal comprising 3 or more audio channels), a video steam comprising a plurality of captured images, or other input modality that may capture an aspect of human interaction.

The feature extraction blocks 120 transform the inputs into lower dimensional high-level representations $z_n(l)$. In the illustrated embodiment, each input modality feeds into a corresponding feature extraction block 120, which is configured to extract features from the particular input modality. The feature extraction may be obtained, for example, by using the encoding part of a neural network trained on a classification task related to the specific modality, using an autoencoder (AE) compression scheme, and/or other feature extraction process. Depending on the signal characteristic of each modality a feed-forward, a convolutional, or other neural network structure could be adopted for this stage. In addition, other deterministic features may be used, such as harmonicity, power levels, short-time Fourier transformation (STFT), Gabor transformations, etc.

The system 100 further includes recurrent neural network (RNN) modules 130, which are individually pre-trained to produce a class vector $y_n(l)$. In the illustrated embodiment, the class vector $y_n(l)$ is a prediction of a one-hot encoded class vector for an arbitrary number of classes. In various embodiments, the RNN modules 130 may be implemented, for example, as Long Short-Term Memory (LSTM) neural networks, gated recurrent unit (GRU) neural networks, Long Short-Term Memory-Connectionist Temporal Classification (LSTM-CTC) neural networks, or other neural network implementation.

A Gate Recurrent Neural Network 140 receives the feature vectors $z_n(l)$ as an input (e.g., as a single stacked vector $z(l)=[z_n(l); \ldots ; z_N(l)])$ and is trained to produce fusion weights $w_n$ to assign a relative weight to each input modality 110. The fusion module 150 receives the fusion weights $w_n$ and prediction vectors $y_n(l)$ and is configured to jointly minimize the average prediction error $C[y(l), a(l)]$ between an oracle class $a(l)$ and the total prediction class $y(l)$ computed as $y(l)=\Sigma_N w_n \times y_n(l)$.

In various embodiments, the system 100 performs one or more actions based on the weighted prediction. For example, the weighted prediction may be used to identify speech and non-speech events for use in audio processing systems that operate to enhance a speech signal for further voice processing, such as voice command processing and/or voice communications. A voice activity determination may be used to detect voice activity to trigger an action, such as to wake up a device from a low power mode. The weighted prediction may further be used to identify and classify input frames associated with the detected events, which may then be provided to one or more applications for further processing. For example, the weighted prediction may include a classification of sound events using multiple input modalities (e.g., audio and video) which can be applied to classification and activity detection of specific musical instruments (e.g. the activity of a violin bow, of drum sticks on a drum set, etc.).

Figure 2:
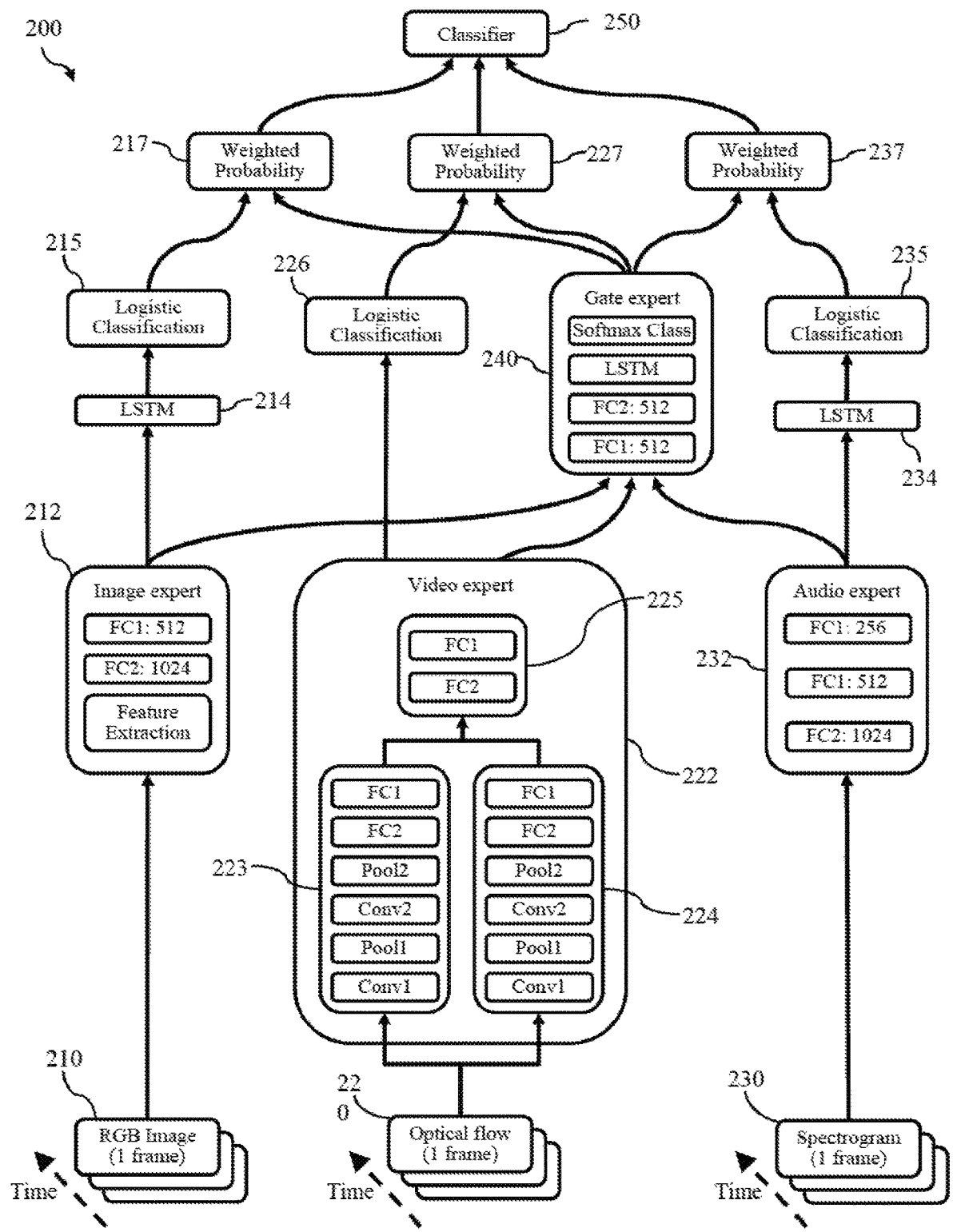
FIG. 2 is an example implementation of an audio-video detection system, according to one or more embodiments of the present disclosure.

An example embodiment of a system 200 for audio/video detection is illustrated in FIG. 2. The system 200 utilizes three input modalities: images, video and audio. A sequence of input images 210, such as digital images captured by a camera or other imaging device are received by an image expert 212. The image expert 212 receives stacked RGB frames as input and includes a convolutional neural network for feature transformation. For example, transfer learning may be employed by using a pre-trained neural network (e.g. the Inception V3 network) and selecting the latent representation at the second layer. The image expert 212 may include one or more convolutional layers which feed into one or more fully connected layers for further processing at a desired dimension (e.g., fully connected layers FC1 and FC2 in the illustrated embodiment). The output of the fully connected layers is then fed an LSTM network 214 which is trained to minimize speech activity classification errors and produce a logistic classification 215.

The video expert 222 receives a video stream, such optical flow 220, as an input. The video stream input may comprise a sequence of individual frames that are stacked for multiple frames for processing by the video expert 222. A preprocessing network (such as networks 223 and 224) may be used for a first feature transformation (e.g. by using an Inception V3 network or a VGG16 network), and the output layer is then fed to fully connected layers 225 to produce a logistic classification 226. The preprocessing networks 223 and 224 may be implemented as trained neural networks comprising convolution layers (conv1 and conv2), pooling layers (pool 1, pool2) and fully connected layers (FC1 and FC2).

The audio expert 232 receives a stream of audio data, which is represented in the illustrated embodiment as a stack of spectrograms 230 of multiple frames. The audio expert 232 may be implemented as one or more deeply connected neural networks used to produce the class prediction. The output of the audio expert 232 is then fed an LSTM network 234 which is trained to minimize speech activity classification errors and produce a logistic classification 235. In some embodiments, the audio expert 232 may include fully connected layers comprising 256, 512 and 1024 neurons, for example.

A gate expert 240 receives the output from the image expert 212, video expert 222 and audio expert 232 and is trained to assign weights to each modality. The gate expert 240 may include a trained neural network comprised of one or more fully connected layers (e.g., FC1 and FC2) and an LSTM to generate a softmax classification, producing a set of normalized weights for the posteriors from each expert network (212, 222 and 232) as illustrated through weighted probability blocks 217, 227 and 237, respectively. The final classification posterior is obtained by the classifier 250 as weighted sum of the expert posteriors generated by the image expert 212, the video expert 222 and the audio expert 232.

Figure 3:
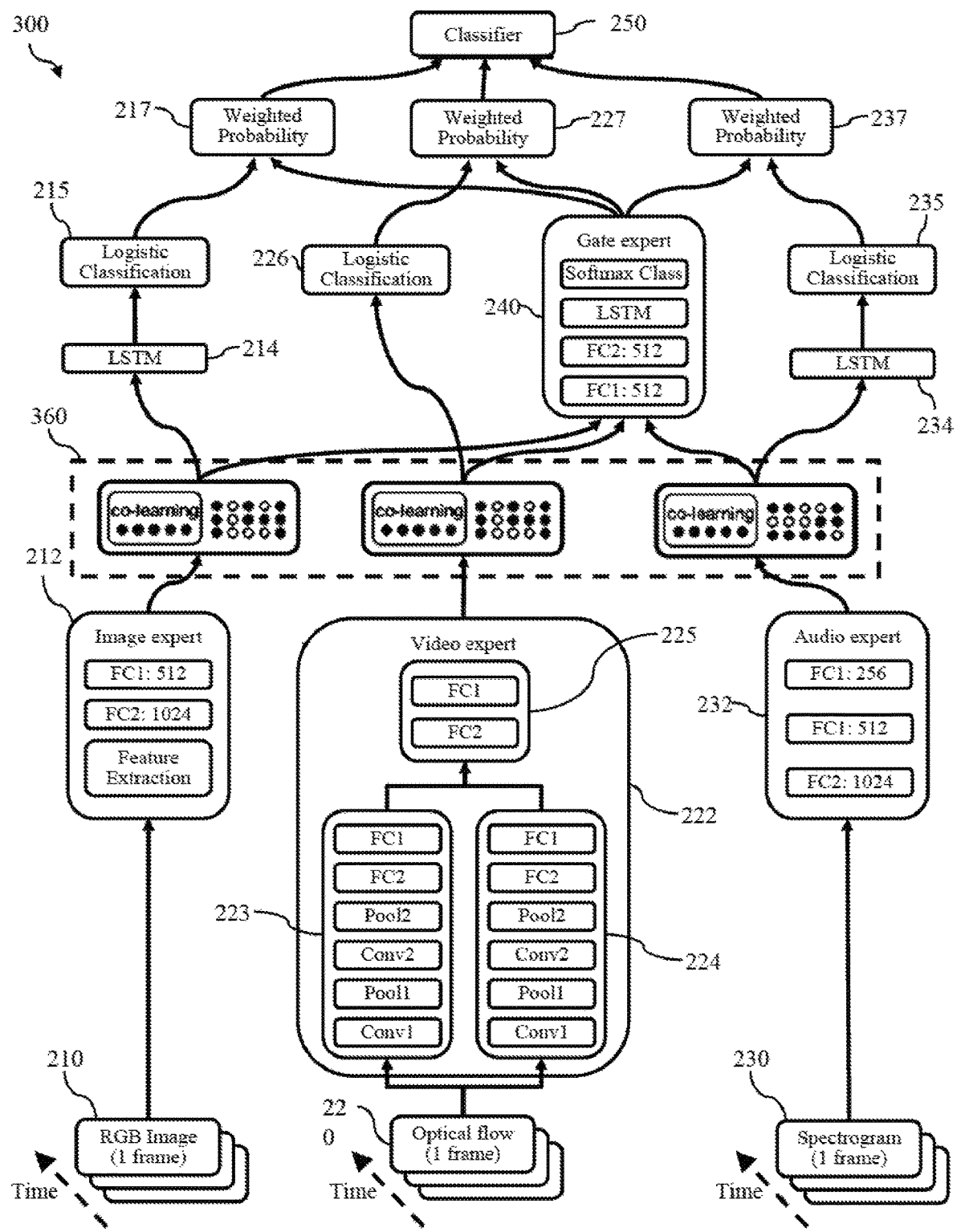
FIG. 3 is an exemplary implementation of an audio-video detection system with co-learning, according to one or more embodiments of the present disclosure.

An example embodiment of an audio/video detection system 300 that utilizes co-learning is illustrated in FIG. 3. Although each input modality is described by a different signal, the temporal activation of certain latent features in $z_n(l)$ may be correlated. For example, for the specific problem of audio/video speech detection, certain features might capture the movement of the talker's lips which is expected to be in sync with the uttered speech. Therefore, after a first individual training of each expert (212, 222 and 232), a joint fine-tune training is employed through a co-learning component 360 to further train the full topology including the gate experts.

To enforce co-learning, a prior distribution may be enforced over the latent variables of the different experts 212, 222, and 232. A penalty-based regularization term is introduced to tie together the activation response of a subset of output activation variables related to different experts. For example, if the subset of variables for co-learning is indicated with $\hat{z}=[\hat{z}_1; \ldots ; \hat{z}_K]$, then a penalty term can be defined for the gradient as:

$$\psi = \frac{1}{K} \sum_K \hat{z}_k$$

$$P = \sum_K \lambda_k \|\hat{z}_k - \psi\|_2^2$$

where $\lambda_K$ is a sensor specific penalty parameter which can be selected during cross-validation. It can be noted that if $\hat{z}_k$ are Gaussian random variables, the penalty is equivalent to imposing a Gaussian prior distribution over $\psi$. This penalty will then induce the activations $\hat{z}_k$ to be correlated. In one embodiment of the network training procedure, $\psi$ could be computed as a moving average of the current mini-batch of samples used in the stochastic gradient descent.

Figure 4:
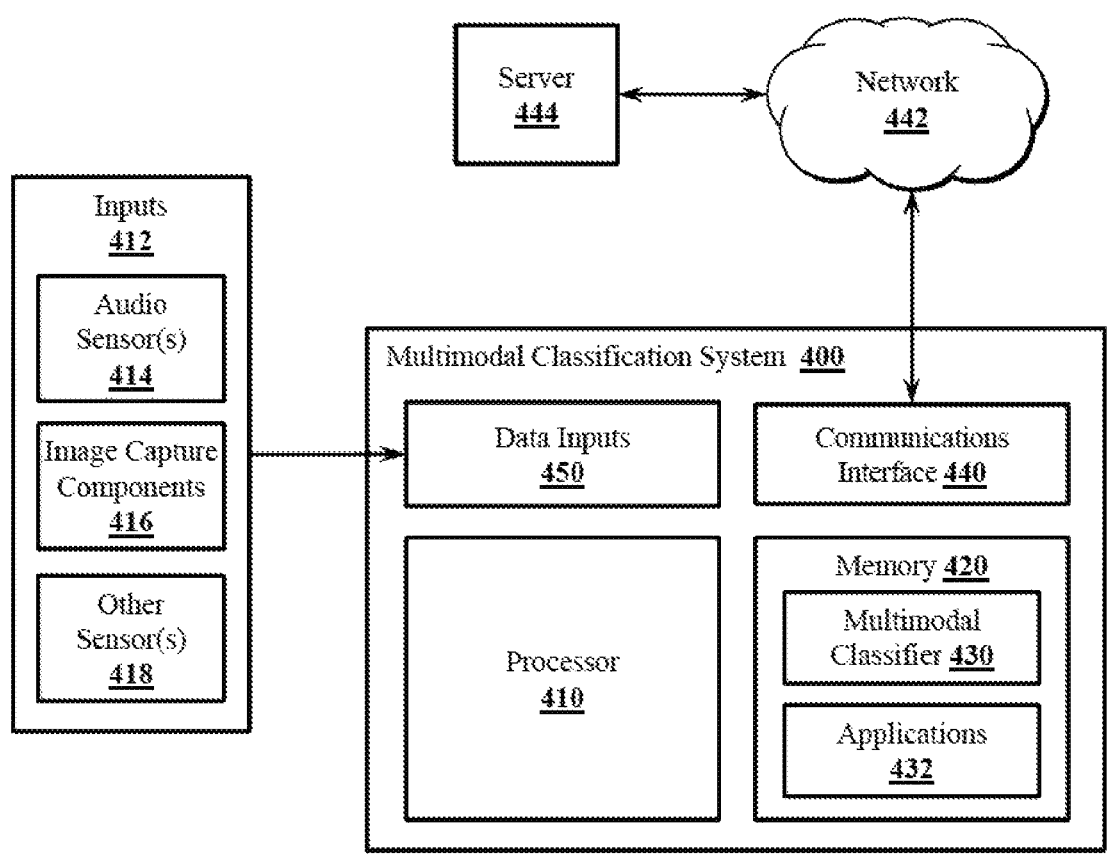
FIG. 4 is an exemplary multimodal classification system, according to one or more embodiments of the present disclosure.

Referring to FIG. 4, an exemplary embodiment of a multimodal classification system will now be described. In various embodiments, the multimodal classification system 400 may be implemented as an intelligent voice assistant, a mobile phone, tablet, laptop computer, desktop computer, voice-interaction device, automobile, cloud service, network server or other system or device. The multimodal classification system 400 may comprise various hardware and software components facilitating the operation of the system including a processor 410, a memory 420, a communications interface 440 for communicating with external devices and networks, such as network 442 (e.g., the Internet, the cloud, a local area network, a cellular network, etc.) and data inputs 450 for receiving data from a plurality of inputs 412, such as audio sensor(s) 414, image capture components 416 and/or other sensor(s) 418 configured to sense conditions, events or other information from its environment.

The processor 410 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure.

The memory 420 may be implemented as one or more memory devices configured to store data and information, including program instructions and associated data for execution by the processor 410. Memory 420 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, data storage network, and/or other types of memory or storage. In the illustrated embodiment, the memory 420 includes program instructions and data for implementing a multimodal classifier 430 in accordance with one or more embodiments of the present disclosure. The memory 420 may further include one or more applications 432 configured to receive the output from the multimodal classifier 430 and provide further processing. In various embodiments, the applications 432 may include audio processing for voice target enhancement, voice command processing, voice over Internet Protocol (VoIP) communications, voice activity detection and/or other applications and processes.

The data inputs 450 receive data associated with a plurality of input modalities such as one or more image sensors (e.g., a camera) for capturing images and video, and one or more audio sensors 414 for receiving voice and audio input (e.g., a microphone array). In various embodiments, the data inputs 450 may receive data associated with any number of input modalities, including other sensor types 418 (e.g., accelerometers, RFID sensor signals, etc.) and input modalities.

The communications interface 440 facilitates communication between the multimodal classification system and one or more external devices or networks. For example, the communications interface 440 may enable Wi-Fi (e.g., 802.11) or Bluetooth connections between the multimodal classification system 400 and one or more local devices, or to a wireless router providing network access to a server, such as through the network 442. In various embodiments, the communications interface 440 may include other wired and wireless communications components facilitating direct or indirect communications between the multimodal classification system and one or more other devices. In some embodiments, the multimodal classification system 400 communicates with a networked server 444, which is configured to perform one or more of the operations disclosed herein (e.g., voice activity detection, multimodal classification, training of one or more of the neural networks, and/or other operations).

The multimodal classification systems and methods disclosed herein have been described with reference to speech activity detection using audio/video information. However, the systems and methods disclosed herein are general and could be applied to any task involving multimodal prediction. For example, the system may be used to produce a phonetical transcription of the speech from both audio and video, and also other sensors (e.g. bone conducing or contact microphones). In another embodiment, a prediction of sound events using both audio and video data can be applied to classification and activity detection of specific musical instruments (e.g. the activity of a violin bow, of drum sticks on a drum set, etc.). In another embodiment, modalities different than audio or video may be used, e.g. by using RFID sensor signals, EEG recordings, accelerometers and/or photoplethysmography signals.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system comprising:
    a plurality of feature extraction modules each configured to receive data associated with a respective input modality of a plurality of input modalities and extract features associated with the respective input modality;
    a plurality of recurrent neural network (RNN) modules each configured to receive the features extracted by a respective one of the feature extraction modules and predict a class associated with the features extracted by the respective feature extraction module;
    a gate expert configured to receive the features extracted by each of the plurality of feature extraction modules and output a set of weights for the plurality of input modalities based on a first neural network, the first neural network being trained to produce the set of weights based on the features extracted by each of the plurality of feature extraction modules; and
    a fusion module configured to generate a weighted prediction based on the predicted classes and the set of weights.

2. The system of claim 1, wherein the plurality of input modalities includes images, video and audio.

3. The system of claim 1, wherein the feature extraction modules comprise an image expert, a video expert and an audio expert.

4. The system of claim 1, wherein each feature extraction module comprises a respective neural network different than the first neural network.

5. The system of claim 1, wherein at least one of the RNN modules comprises a long short-term memory network.

6. The system of claim 1, wherein the gate expert comprises a long short-term memory network.

7. The system of claim 1, further comprising a co-learning framework.

8. A method comprising:
    receiving a plurality of data streams associated with a plurality of input modalities, respectively;
    extracting, from each data stream of the plurality of data streams, features associated with a respective input modality of the plurality of input modalities;
    predicting a plurality of classes based on a plurality of recurrent neural networks (RNNs), respectively, each RNN of the plurality of RNNs being configured to predict the respective class based on the features associated a respective input modality of the plurality of input modalities;
    generating a set of weights for the plurality of input modalities based on a first neural network, the first neural network being trained to produce the set of weights based on the features associated with each input modality of the plurality of input modalities; and
    generating a weighted prediction based on the predicted classes and the set of weights.

9. The method of claim 8, wherein receiving the plurality of data streams comprises sensing, using a plurality of sensor types, one or more conditions in an environment, and wherein each of the plurality of sensor types has a corresponding input modality.

10. The method of claim 9, wherein each of the plurality of data streams contributes to the weighted prediction with a different degree of confidence depending on sensed conditions.

11. The method of claim 9, wherein the set of weights is generated dynamically to combine information from the plurality of sensor types in accordance with sensed conditions.

12. The method of claim 8, wherein the first neural network comprises a gating modular neural network trained to dynamically generate a set of weights for outputs of a plurality of sensor networks, at least in part, by balancing a utility of each data stream.

13. The method of claim 8, wherein the generating of the weighted prediction comprises:
    detecting voice activity in the plurality of data streams; and
    providing corresponding input frames to one or more applications for further processing.

14. The method of claim 8, wherein the plurality of input modalities includes images, video and audio.

15. A system comprising:
    a memory storing instructions;
    a processor coupled to the memory and configured to execute the instructions to cause the system to perform operations comprising:
    receiving a plurality of data streams associated with a plurality of input modalities, respectively;
    extracting, from each data stream of the plurality of data streams, features associated with a respective input modality of the plurality of input modalities;
    predicting a plurality of classes based on a plurality of recurrent neural networks (RNNs), respectively, each RNN of the plurality of RNNs being configured to predict the respective class based on the features associated with a respective input modality of the plurality of input modalities;
    generating a set of weights for the plurality of input modalities based on a first neural network, the first neural network being trained to produce the set of weights based on the features associated with each input modality of the plurality of input modalities; and
    generating a weighted prediction based on the plurality of classes and the set of weights.

16. The system of claim 15, wherein the plurality of input modalities includes images, video and audio.

17. The system of claim 15, wherein extracting features associated with the respective input modality comprises inputting the data stream to a trained neural network.

18. The system of claim 15, wherein each of the plurality of RNNs comprises a long short-term memory network.

19. The system of claim 15, wherein the first neural network comprises a long short-term memory network.

* * * * *